US007181160B2

(12) United States Patent
Barrett

(10) Patent No.: US 7,181,160 B2
(45) Date of Patent: *Feb. 20, 2007

(54) METHOD AND APPARATUS FOR PROVIDING A SIGNAL TO PASSENGERS OF A PASSENGER VEHICLE

(75) Inventor: Michael J. Barrett, Temple, NH (US)

(73) Assignee: AeroSat Corporation, Temple, NH (US)

( * ) Notice: Subject to any disclaimer, the term of this patent is extended or adjusted under 35 U.S.C. 154(b) by 313 days.

This patent is subject to a terminal disclaimer.

(21) Appl. No.: 10/810,369

(22) Filed: Mar. 26, 2004

(65) Prior Publication Data

US 2004/0180707 A1 Sep. 16, 2004

Related U.S. Application Data

(63) Continuation of application No. 09/382,969, filed on Sep. 16, 1999, now Pat. No. 6,751,442, which is a continuation of application No. 08/932,190, filed on Sep. 17, 1997, now Pat. No. 5,973,647.

(51) Int. Cl.
*H04B 7/15* (2006.01)

(52) U.S. Cl. ...................... 455/11.1; 455/430; 455/13.1

(58) Field of Classification Search ............... 455/11.1, 455/456.1, 457, 13.2, 430, 431, 456.2, 13.1, 455/41.1, 41.2, 41.3
See application file for complete search history.

(56) References Cited

U.S. PATENT DOCUMENTS 2,405,242 A 8/1946 Southworth
2,542,823 A * 2/1951 Lyle .......................... 455/13.1
2,571,386 A * 10/1951 Sarnoff ....................... 342/367
2,573,746 A 11/1951 Watson et al.
2,579,591 A * 12/1951 Ley et al. .................. 455/11.1
2,626,348 A * 1/1953 Nobles ...................... 455/11.1

(Continued)

FOREIGN PATENT DOCUMENTS

DE 197 48 681 A1 5/1999

(Continued)

OTHER PUBLICATIONS

Alanyali M. et al., "On Simple Algorithms for Dynamic Load Balancing," INFOCOM '95, IEEE, Apr. 1995, pp. 230-238.

(Continued)

*Primary Examiner*—Lana Le
(74) *Attorney, Agent, or Firm*—Lowrie, Lando & Anastasi, LLP.

(57) ABSTRACT

A system that provides information to a second passenger vehicle, to create an information network between the second passenger vehicle and an information source, the system including a first transmitter/receiver unit disposed on a first passenger vehicle and adapted to receive an information signal that includes the information from the information source, and to transmit the information signal, a receiver located on the second passenger vehicle, the receiver being adapted to receive the information signal, and adapted to provide at least some of the information for access by a passenger associated with the second passenger vehicle, and a second transmitter/receiver unit that receives the information signal and transmits the information signal, to provide the information signal between the first transmitter/receiver unit and the receiver.

40 Claims, 9 Drawing Sheets

U.S. PATENT DOCUMENTS

| | | | | |
|---|---|---|---|---|
| 2,748,266 | A | 5/1956 | Boyd | |
| 3,281,851 | A | 10/1966 | Goebels | |
| 3,687,213 | A | 8/1972 | Sato et al. | |
| 3,701,162 | A | 10/1972 | Seaton | |
| 4,056,779 | A * | 11/1977 | Toler | 455/11.1 |
| 4,163,216 | A * | 7/1979 | Arpino | 455/431 |
| 4,234,959 | A | 11/1980 | Andrea, III et al. | |
| 4,451,699 | A | 5/1984 | Gruenberg | |
| 4,518,967 | A | 5/1985 | Westerman | |
| 4,539,706 | A | 9/1985 | Mears et al. | |
| 4,823,139 | A | 4/1989 | Eisner et al. | |
| 4,882,765 | A | 11/1989 | Maxwell et al. | |
| 4,916,458 | A | 4/1990 | Goto | |
| 5,045,839 | A | 9/1991 | Ellis | |
| 5,056,152 | A | 10/1991 | Truby et al. | |
| 5,109,526 | A | 4/1992 | Reed | |
| 5,201,834 | A * | 4/1993 | Grazioli et al. | 455/422.1 |
| 5,239,666 | A | 8/1993 | Truby | |
| 5,303,240 | A | 4/1994 | Borras et al. | |
| 5,309,162 | A | 5/1994 | Uematsu et al. | |
| 5,311,302 | A | 5/1994 | Berry et al. | |
| 5,345,594 | A | 9/1994 | Tsuda | |
| 5,355,511 | A * | 10/1994 | Hatano et al. | 455/11.1 |
| 5,371,901 | A | 12/1994 | Reed et al. | |
| 5,383,187 | A | 1/1995 | Vardakas et al. | |
| 5,390,214 | A | 2/1995 | Hopkins et al. | |
| 5,392,053 | A | 2/1995 | Hirata et al. | |
| 5,416,492 | A | 5/1995 | Takahashi et al. | |
| 5,428,544 | A | 6/1995 | Shyu | |
| 5,530,909 | A * | 6/1996 | Simon et al. | 455/11.1 |
| 5,570,354 | A | 10/1996 | Simon | |
| 5,577,264 | A | 11/1996 | Tuohino | |
| 5,579,019 | A | 11/1996 | Uematsu et al. | |
| 5,594,937 | A | 1/1997 | Stiles et al. | |
| 5,659,879 | A | 8/1997 | Dupuny | |
| 5,689,245 | A | 11/1997 | Noreen et al. | |
| 5,729,826 | A | 3/1998 | Gravrilovich | |
| 5,768,683 | A | 6/1998 | Mulford | |
| 5,793,762 | A * | 8/1998 | Penners et al. | 455/13.2 |
| 5,818,385 | A * | 10/1998 | Bartholomew | 455/456.6 |
| 5,857,144 | A | 1/1999 | Mangum et al. | |
| 5,880,693 | A | 3/1999 | Drummer | |
| 5,887,258 | A | 3/1999 | Lemozit et al. | |
| 5,915,208 | A | 6/1999 | Collyer | |
| 5,937,332 | A | 8/1999 | Karabinis | |
| 5,956,639 | A | 9/1999 | Ambruster et al. | |
| 5,973,647 | A | 10/1999 | Barrett et al. | |
| 5,982,333 | A * | 11/1999 | Stillinger et al. | 342/359 |
| 5,995,804 | A | 11/1999 | Rootsey et al. | |
| 5,995,845 | A | 11/1999 | Lardennois | |
| 6,047,165 | A | 4/2000 | Wright et al. | |
| 6,058,288 | A | 5/2000 | Reed et al. | |
| 6,085,151 | A | 7/2000 | Farmer et al. | |
| 6,104,712 | A | 8/2000 | Robert et al. | |
| 6,104,910 | A | 8/2000 | Koths | |
| 6,125,261 | A | 9/2000 | Anselmo et al. | |
| 6,141,533 | A | 10/2000 | Wilson et al. | |
| 6,150,961 | A | 11/2000 | Alewine et al. | |
| 6,236,337 | B1 | 5/2001 | Beier et al. | |
| 6,285,878 | B1 | 9/2001 | Lai | |
| 6,400,690 | B1 | 6/2002 | Liu et al. | |
| 6,459,881 | B1 | 10/2002 | Hoder et al. | |
| 6,473,617 | B1 | 10/2002 | Larsen et al. | |
| 6,564,002 | B1 | 5/2003 | Murakami et al. | |
| 6,577,419 | B1 | 6/2003 | Hall et al. | |
| 6,947,742 | B1 * | 9/2005 | Corrigan | 455/431 |
| 2004/0053651 | A1 * | 3/2004 | Rieder et al. | 455/11.1 |
| 2005/0003873 | A1 * | 1/2005 | Naidu et al. | 455/562.1 |

FOREIGN PATENT DOCUMENTS

| | | | |
|---|---|---|---|
| EP | 0 329 079 | A | 8/1989 |
| EP | 0 860 954 | B1 | 8/1998 |
| EP | 1 017 188 | A2 | 7/2000 |
| EP | 1 058 409 | A1 | 12/2000 |
| FR | 2 638 288 | A | 4/1990 |
| GB | 2 161 652 | A | 1/1986 |
| GB | 2 247 990 | A | 3/1992 |
| GB | 2 346 511 | A | 8/2000 |
| JP | 6061900 | A | 3/1994 |

OTHER PUBLICATIONS

Kremer, W. et al., "Computer-Aided Design and Evaluation of Mobile Radio Local Area Networks in RTI/IVHS Environments," IEEE Journal on Selected Areas in Communications, vol. 11, No. 3, Apr. 1993, pp. 406-421.

Newton's Telecom Dictionary, 1995, Flatiron Publishing, Inc., definition of FDMA, p. 479.

* cited by examiner

METHOD AND APPARATUS FOR PROVIDING A SIGNAL TO PASSENGERS OF A PASSENGER VEHICLE

CROSS-REFERENCE TO RELATED APPLICATIONS

This application is a continuation of, and claims priority under 35 U.S.C. § 120 to, U.S. patent application Ser. No. 09/382,969 entitled "LOW-HEIGHT, LOW-COST, HIGH-GAIN ANTENNA AND SYSTEM FOR MOBILE PLATFORMS," filed Sep. 16, 1999, now U.S. Pat. No. 6,751,442, which is a continuation of, and claims priority under 35 U.S.C. § 120 to, U.S. patent application Ser. No. 08/932,190 entitled "LOW-HEIGHT, LOW-COST, HIGH-GAIN ANTENNA AND SYSTEM FOR MOBILE PLATFORMS," filed Sep. 17, 1997, now U.S. Pat. No. 5,973,647.

BACKGROUND

1. Field of the Invention

The present invention relates to a communication system for passenger vehicles and, more particularly, a system for providing satellite broadcasted video, and other signals, directly to passengers on passenger vehicles such as, for example, airplanes, boats and automobiles.

2. Background of the Invention

A major drawback of many types of radio communication systems is that their range is limited to radio horizon (radioelectric range by direct propagation). This drawback can only be obviated by the installation of relays between two stations situated out of radio range. Satellites can be used as relays, but this solution is still expensive when complete global coverage is required, as presently existing systems require that a large number of satellites be maintained in service in order for one or two satellites to be in view at every point on the globe.

One relay system for transmitting information between an emitting station and a receiving station that are separated by a distance exceeding the range of direct communications of these stations is disclosed in U.S. Pat. No. 5,530,909 to Simon et al. Simon discloses equipping aerodynes (e.g., airplanes) traveling in the space included between the two stations with open communications relay systems of limited range which can momentarily interconnect, when within range of one another, in order to pass information from relay system to relay system up to its destination.

Another relaying system using aircraft to relay an information signal to create an early warning system is disclosed in U.S. Pat. No. 2,571,386 to Sarnoff. Sarnoff describes forming a continuous line of relay transmission by flying a number of aircraft in a line, spaced such that direct communication between adjacent aircraft in the line is possible. Each aircraft serves as a relay link to maintain communication between stations at the ends of the line.

Thus, the systems described in Simon and Sarnoff, and other similar systems, use aircraft as relays to enable communication between two stations that are otherwise out of range of one another.

SUMMARY OF THE INVENTION

According to one embodiment of the present invention, a system that provides information to a second passenger vehicle, to create an information network between the second passenger vehicle and an information source, comprises a first transmitter/receiver unit disposed on a first passenger vehicle and adapted to receive an information signal that includes the information from the information source, and to transmit the information signal, a third transmitter/receiver unit adapted to receive the information signal and to transmit the information signal, to provide the information signal between the first transmitter/receiver unit and the second passenger vehicle, a second transmitter/receiver unit located on the second passenger vehicle, the second transmitter/receiver unit being adapted to receive the information signal, and a passenger interface coupled to the second transmitter/receiver unit and adapted to provide at least some of the information for access by a passenger associated with the second passenger vehicle.

Another embodiment of the present invention is a method for providing information from a source to a second passenger vehicle, the method comprising acts of receiving an information signal that includes the information at a first passenger vehicle, re-transmitting the information signal from the first passenger vehicle, receiving the information signal and re-transmitting the information signal to provide the information signal between the first passenger vehicle and the second passenger vehicle, receiving the information at the second passenger vehicle, and providing at least some of the information for access by a passenger associated with the second passenger vehicle.

With this arrangement, any of live video programming, images, interactive services such as the internet, two-way communications such as telephone communication and other data signals can be provided to passengers within vehicles even though the vehicles are not within an area where the signal can be received due to, for example, a lack of satellite coverage, or non-continuous satellite coverage, or a lack of ground to air communications facilities, or a poor signal quality. This is particularly advantageous for aircraft flight paths such as, for example, transoceanic flights where a plurality of airplanes are lined up in a path traversing an ocean and where satellite coverage is not yet available above the ocean.

Other objects and features of the present invention will become apparent from the following detailed description when taken in connection with the following drawings. It is to be understood that the drawings are for the purpose of illustration only and are not intended as a definition of the limits of the invention.

BRIEF DESCRIPTION OF THE DRAWINGS

The foregoing and other objects and advantages will be more fully appreciated from the following drawing in which.

DETAILED DESCRIPTION

The antenna and system of the present invention provide, for example, any of live broadcast television programming, two-way communications signals, interactive service signals such as internet service, and other forms of data signals directly to passengers on mobile platforms such as, for example, airplanes, boats and automobiles. In a preferred embodiment, the antenna and system is to be used with existing digital satellite broadcasting satellites and technology to provide live broadcast television programming to the passengers. For example, in the preferred embodiment of the antenna and system of the invention, passengers in a vehicle can select and view live news channels, weather information, sporting events, network programming, and movies similar to programming that is available in most homes either through cable or satellite services. One advantage of the preferred embodiment of the antenna and system of the present invention is that the programming is live with no need for video-tape duplication and distribution, and since no tapes are required, all equipment can be located in a storage area of the passenger vehicle thereby not consuming any passenger space.

Figure 1:
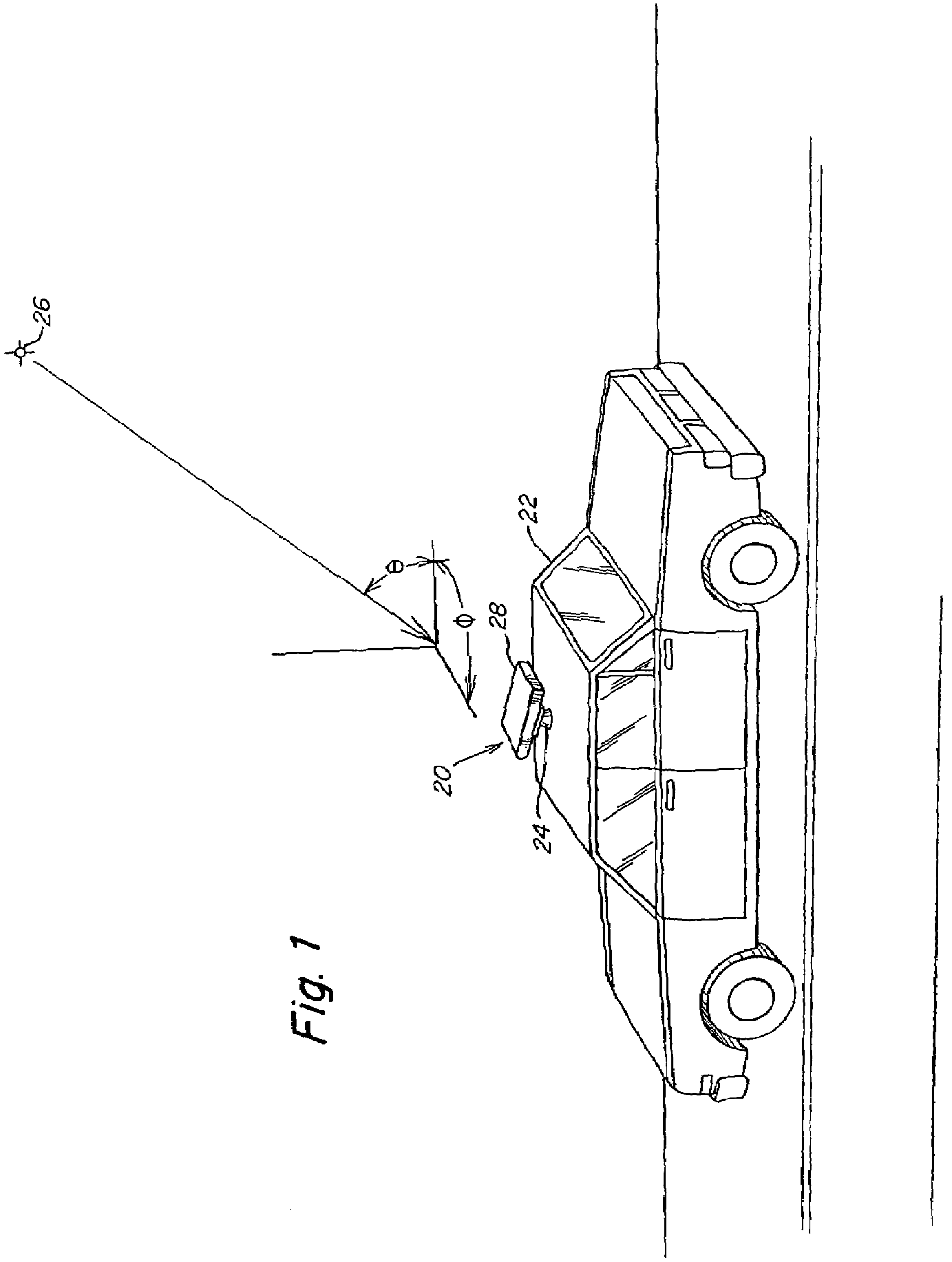
FIG. 1 is a perspective view of an antenna subsystem of the present invention mounted on a roof of an automobile.

A single antenna on a vehicle may support generation of any of the signals discussed above for all passengers in the vehicle. Referring to FIG. 1, one embodiment of the antenna subsystem 20 is a low-height, low-cost, high-gain, leaky wave array antenna 28 that may be disposed in a low-drag radome (not illustrated) and may be mounted for example, to a roof top of the automobile 22. The antenna subsystem may include antenna positioning apparatus 24 such as, for example a motor driven gimble system, so that the antenna may be move 360° in azimuth ($\phi$) and, for example, over a range of approximately 50° in elevation ($\theta$). The low-drag radome preferably will taper to the vehicle and allow movement of the antenna positioning apparatus and antenna in both azimuth and elevation.

In one embodiment of the antenna subsystem of the present invention, a beam pattern of the antenna 28 may have a beam width in azimuth of approximately 4° to 5° which may be scanned in the azimuth plane by physical movement of the antenna array over 360° in azimuth. In addition, the beam pattern of the antenna may have a beam width in the elevation plane of approximately 4° to 8° which may be scanned in the elevation plane by physical movement of the antenna array over approximately a 50° elevation sector such as, for example, over an elevation angle range between 20° to 70°. The antenna subsystem 20 of the present invention will track the location of a transmitting satellite 26 with respect to the position and orientation of the moving vehicle and will point the antenna beam towards the transmitting satellite.

Figure 2:
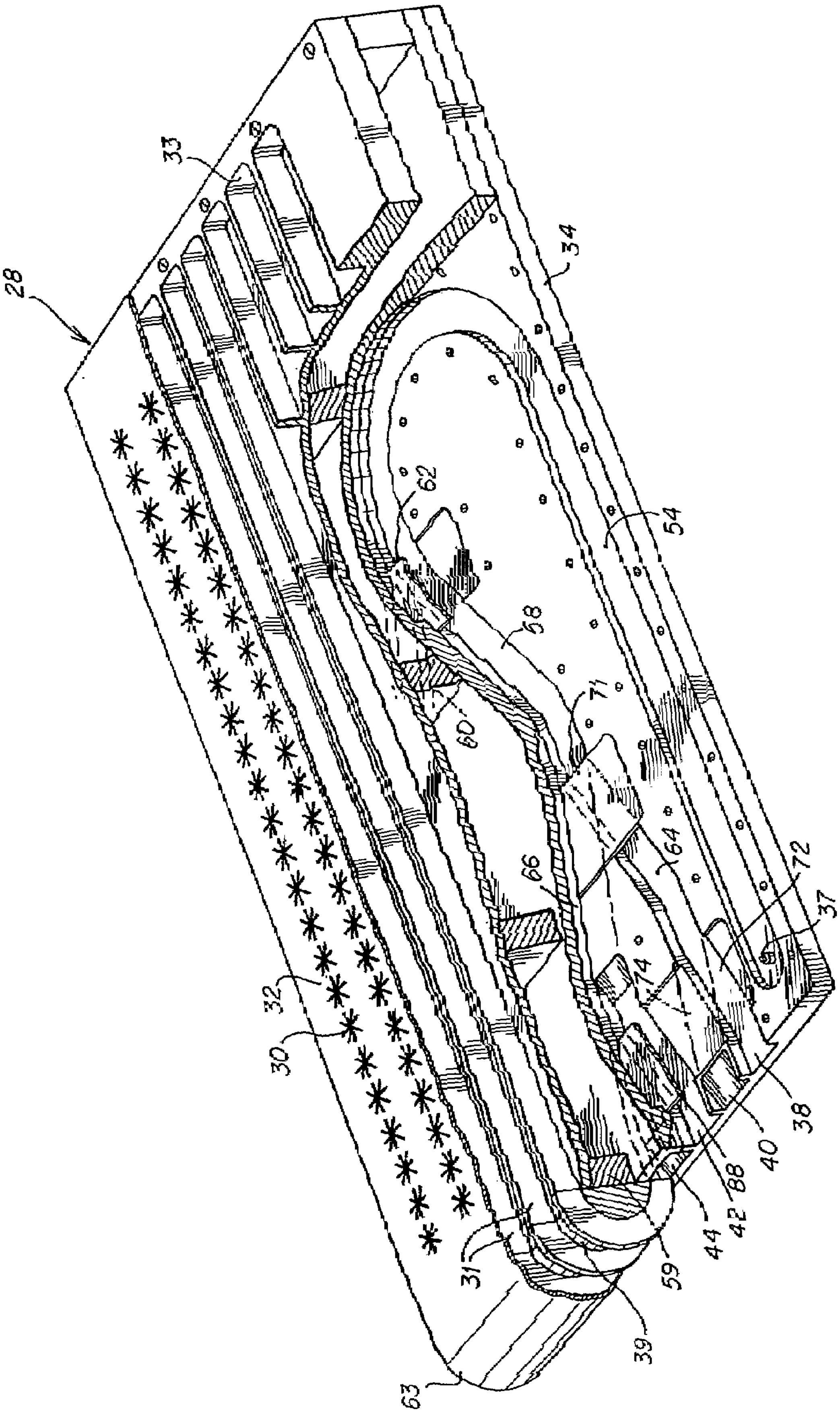
FIG. 2 is a perspective view partially broken away of an antenna of the antenna subsystem of FIG. 1.
Figure 3:
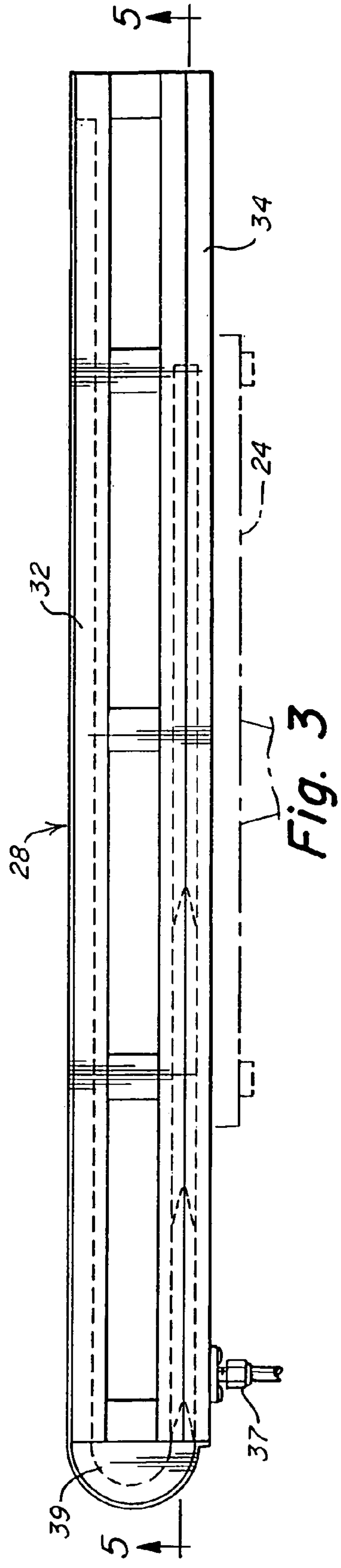
FIG. 3 is a side elevational view of the antenna of FIG. 2.
Figure 4:
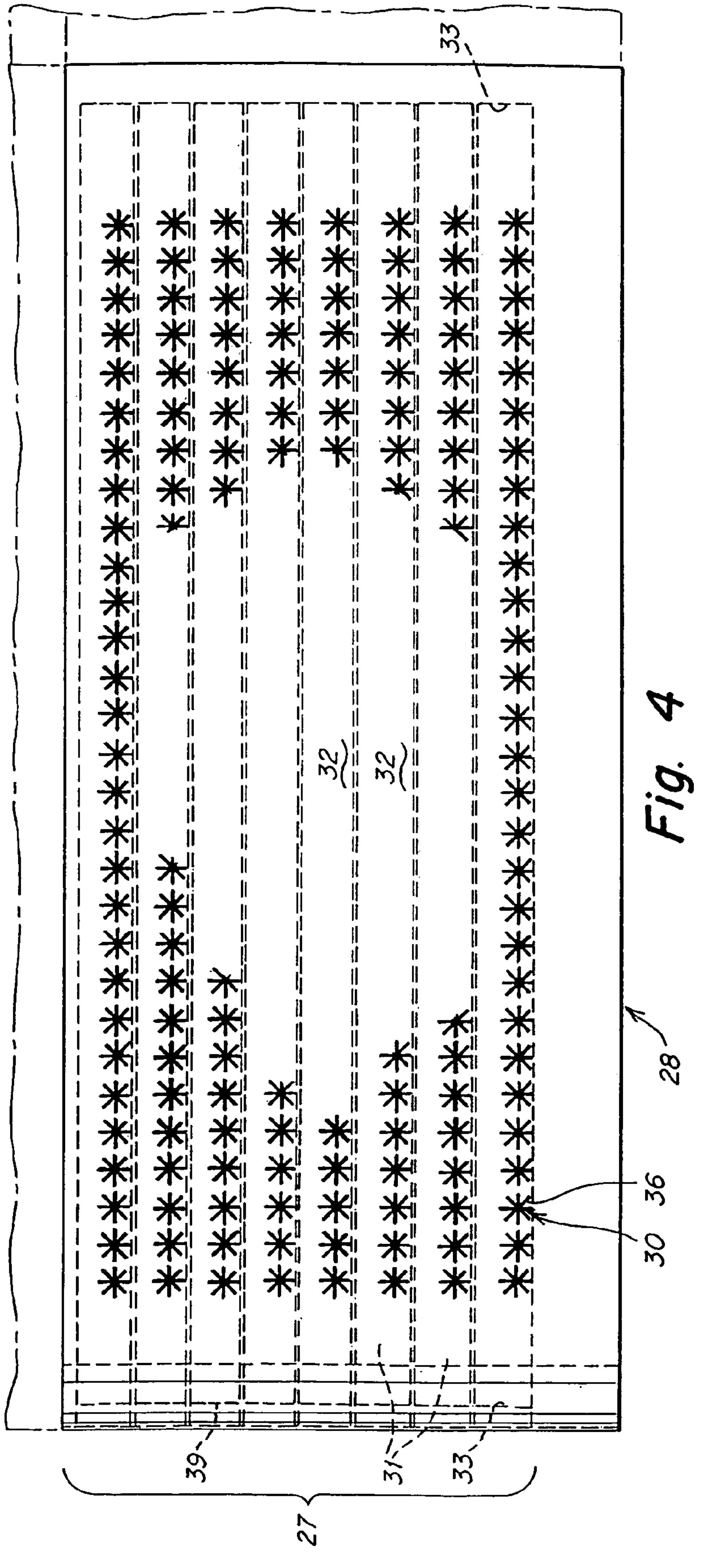
FIG. 4 is a top plan view of the antenna of FIG. 2.

FIG. 2 is a perspective, partially broken away view of one embodiment of the antenna 28 of the present invention; FIG. 3 is a side elevational view of the antenna of FIG. 2 and FIG. 4 is a top plan view of the antenna of FIG. 2. Referring to FIGS. 2 and 4, the antenna 28 of the present invention may include an array 27 of substantially rectangular waveguides 31, wherein each substantially rectangular waveguide may include one or more apertures 30 in a broad (H-plane) wall 32 of the substantially rectangular waveguide. It is to be appreciated that any aperture can be used that will transmit and/or receive electromagnetic energy in a desired polarization such as, for example, a circular polarization. In a preferred embodiment, the apertures are asterisk-shaped aperture elements in the broad wall of the waveguide that can be formed, for example, by forming a first crossed slot element and then forming a second crossed slot element rotated by 45° from the first cross element in the broad wall of the waveguide. The legs 36 of the asterisk-shaped element slightly reduce the elements' sensitivity to amplitude of a transmitted and/or receive electromagnetic signal. In addition, it is easier to empirically determine a desired configuration of the antenna elements to provide a desired amplitude and axial ratio of the antenna using the asterisk-shaped antenna elements.

The substantially rectangular waveguides 31 are oriented so that narrow walls of the waveguides are disposed in parallel to each other and the broad (H-plane) walls 32 including the apertures 30 form the array of antenna elements. The apertures are preferably spaced apart at a half of a wavelength of an operating frequency along a length or the axis of the substantially rectangular waveguide and preferably transmit and/or receive electromagnetic energy at a 45° elevation angle referenced to either the plane of the antenna array (horizontal) or a normal to the antenna array (vertical). Each of the rectangular waveguides is fed at one end 33 by a waveguide feed 34 and is terminated at a second end 33 by a non-reflecting match load (not illustrated).

Figure 5:
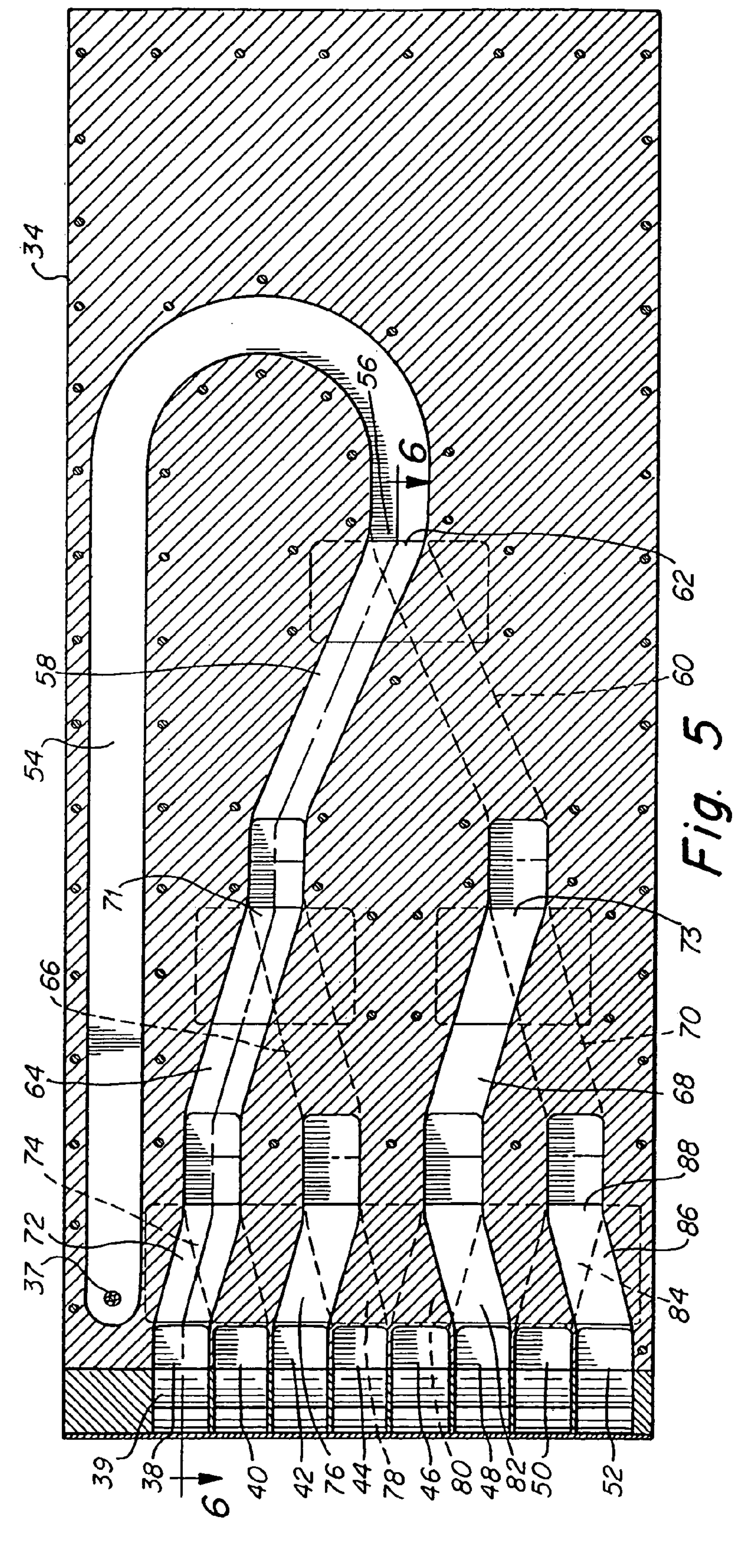
FIG. 5 is a cross-sectional bottom plan view of an embodiment of a waveguide feed of the antenna, taken along line 5—5 of FIG. 3.

Referring now to FIG. 5, there is illustrated a cross-sectional bottom plan view of the waveguide feed 34 taken along line 5—5 of the antenna 28 illustrated in FIG. 3. As discussed above, the antenna and waveguide feed can be used to transmit and/or receive electromagnetic energy. In a preferred embodiment, the antenna and waveguide feed are use to transmit and/or receive satellite broadcast signals for digital video programming. Operation of the antenna will now be described for the case when the antenna is to transmit electromagnetic energy. The electromagnetic energy is fed to each substantially rectangular waveguide 31 (See FIG. 4) via the waveguide feed 34. In particular, an electromagnetic signal is provided to the waveguide feed at an input/output port 37 and the signal is equally divided both in phase and in amplitude by the waveguide feed to provide an equal amplitude and phase signal at each of signal ports 38, 40, 42, 44, 46, 48, 50 and 52. As will be discussed in greater detail below, the electromagnetic signals at each of ports 38–52 are preferably provided to each of the substantially rectangular waveguides 31 by a corresponding E-plane bend 39 as illustrated in FIG. 3. The electromagnetic signal is induced in the waveguide feed at port 37, propagates through the waveguide feed and is fed to each of the substantially rectangular waveguides, and is preferably in a $TE_{10}$ dominant mode of the electromagnetic signal. The $TE_{10}$ dominant mode of the electromagnetic signal propagates along the length or axis of each substantially rectangular waveguide to feed each aperture 30 in the broad (H-plane) wall 32 of each substantially rectangular waveguide so as to radiate the circularly polarized antenna pattern at the desired elevation angle $\theta$, as discussed above.

Operation of the antenna 28 and the waveguide feed 34 when the antenna is to receive an electromagnetic signal such as a digital satellite broadcast signal is opposite to that discussed above for transmitting an electromagnetic signal. In particular, each of the apertures 30 in the broad wall 32 of each substantially rectangular waveguide 31 receives a circularly polarized electromagnetic signal and induces a $TE_{10}$ dominant mode of the electromagnetic signal within each substantially rectangular waveguide. The dominant mode of the electromagnetic signal propagates along the length or axis of the substantially rectangular waveguide to the end 33 of the substantially rectangular waveguide and is coupled to a corresponding signal port 38–52 of the waveguide feed 34 by a respective E-plane bend 39. The electromagnetic signal at each of signal ports 38–52 is then combined or summed via the waveguide feed to provide a combined or summed signal at the input/output port 37 of the waveguide feed.

Figure 6:
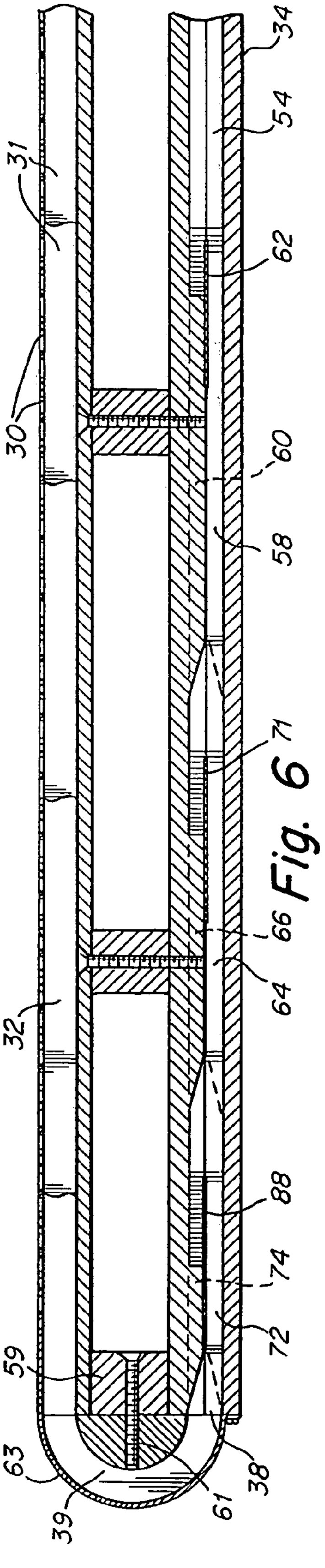
FIG. 6 is a cross-sectional side view of the antenna, taken along line 6—6 of FIG. 5.

FIG. 6 illustrates a cross-sectional side view of the waveguide feed 34 taken along line 6—6 of the feed as illustrated in FIG. 5. The plurality of E-plane bends 39 allow the waveguide feed 34 to be located under the antenna array, thus reducing a total length of the antenna 28. The E-plane bends couple each substantially rectangular waveguide 31 to a corresponding port 38–52 of the waveguide feed and include a curved section 39 of an acceptable bend radii as known to those of skill in the art. For example, a reference by Theodore Moreno, *Microwave Transition Design Data*, McGraw-Hill, 1948 provides specific recommendations for the use of E-plane bends with waveguides. Each of the E-plane bends can be secured to a spacer 158 between the antenna array 27 and the waveguide feed 34 by a corresponding screw 160. In addition, each of the E-plane bends can be sealed with an end-cap 162. It is to be appreciated that although the antenna array and the feed waveguide have been described and illustrated in two different planes, in particular, with the feed waveguide disposed below the antenna array, the feed waveguide and the antenna array may be in a same plane; for example the antenna array of waveguide may be coupled to the corresponding signal ports of the feed waveguide by a plurality of the H-plane bends or waveguide sections.

It is to be appreciated that although the waveguide antenna and waveguide feed have been described for a single polarized signal, that other embodiments are contemplated to be within the scope of the present invention. For example, each waveguide of the plurality of radiation waveguides may have two parallel rows of a plurality of apertures disposed along the axis of the waveguide wherein one row of apertures may be at a left side of a center axis of the broad wall and is used to transmit and/or receive a left hand circularly polarized signal and a second row of apertures may be at a right of the center axis of the broad wall and may be used to transmit and/or receive a right hand circularly polarized signal. For this embodiment, each of the left hand circularly polarized signal and the right hand circularly polarized signal may be fed and/or may provide the signal at one end of the waveguide and therefore only a single waveguide feed need be used to transmit and/or receive the left hand and right hand circularly polarized signals. In particular, a switching device such as, for example, a PIN diode may be used to switch between the left hand circularly polarized signal and the right hand circularly polarized signal to provide and/or receive the signal at the end of the waveguide. The switching device may be disposed, for example, at the end of each radiation waveguide where it is coupled to the waveguide feed.

Referring to FIG. 5, the waveguide feed includes a first section of waveguide 54 that has a full height for a waveguide operating at a particular wavelength or frequency and in the $TE_{10}$ mode. In other words, the height of the first section of waveguide is substantially the same as the height of the waveguides 31 of the antenna 28. At a first junction point 56, the first section of waveguide 54 is divided into a pair of half-height waveguide sections 58, 60. A second section 58 of waveguide is transitioned to a height that is substantially half of the height of the first section of waveguide by a downward ramp in the height of the waveguide, while a third section 60 of waveguide is transitioned to the half-height by an upward ramp in the height of the waveguide. In addition, a septum 62 is provided at the first junction point 56 to aid in the transition from a full height waveguide section to the pair of half-height waveguide sections. The septum is preferably substantially or infinitely thin such as, for example, on the order of 0.006" thick, is conductive and contacts the narrow walls of the waveguide sections 56, 58 and 60 to aid in alignment of the full height to half-height transition.

In a similar manner, each of the half-height waveguide sections 58 and 60 is divided into a first pair 64, 66 and a second pair 68, 70 of corresponding half-height waveguide sections. It is to be appreciated that waveguide sections 58, 60; 64, 66 and 68, 70 are mirror images of each other or, in other words, each of waveguide sections 58, 64, 68 has a decline or downwardly disposed ramp to form a half-height waveguide element and each of waveguide sections 60, 66, 70 has an incline or upwardly disposed ramp to form a half-height waveguide element of substantially equal length to waveguide element 58, 64, 68. In addition, corresponding septums 72 and 74 are provided at a second junction points between the second section of waveguide, the third section of waveguide and waveguide sections 64,66, and 68, 70 to aid in the transition from one half-height waveguide element to two half-height waveguide elements. The waveguide elements 64, 66 and 68, 70 are mirror images of each other. It is to be appreciated that in a similar manner, each of waveguide sections 64, 66, 68 and 70 are transitioned from a single half-height waveguide section to a pair of corresponding half-height waveguide sections 72, 74; 76, 78; 80, 82; and 84, 86 which are coupled to each of the corresponding signal ports 38, 40, 42, 44, 46, 48, 50 and 52. A septum 88 aids in each transition from a single half-height waveguide section to two half-height waveguide sections. Each of the waveguide elements 72, 74; 76, 78; 80, 82; and 84, 86 are mirror images of each other. It is the combination of the full height and the pairs of half-height waveguide sections that are mirror imaged with inclining and declining ramps as well as the septums that make up a 1-to-8 element waveguide feed illustrated in FIG. 5.

Figure 7:
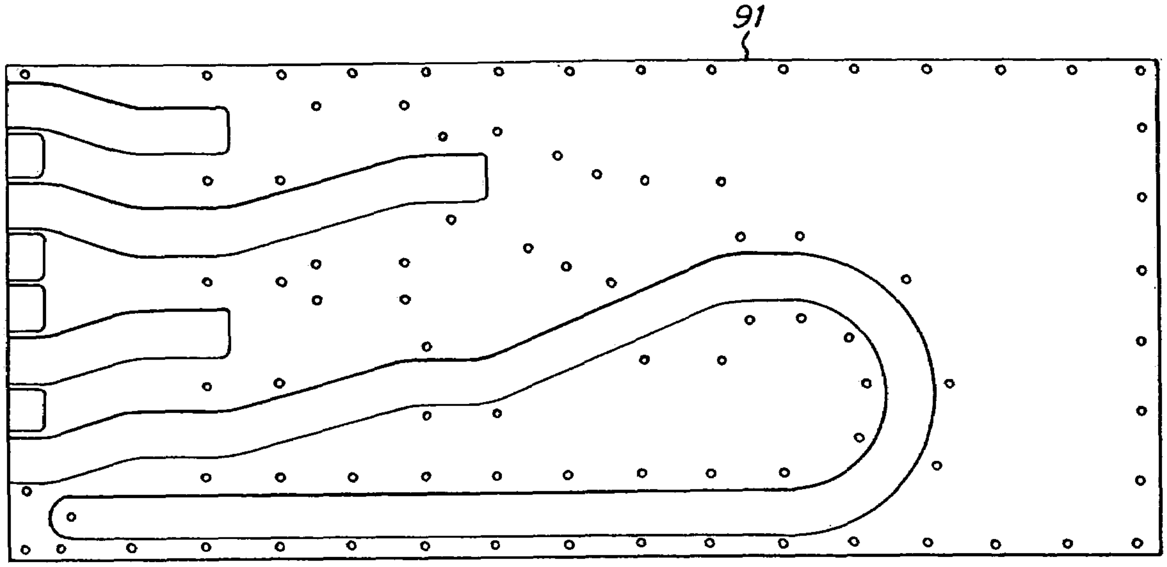
FIG. 7 is a plan view of one half of a waveguide feed of the antenna of FIG. 2.
Figure 8:
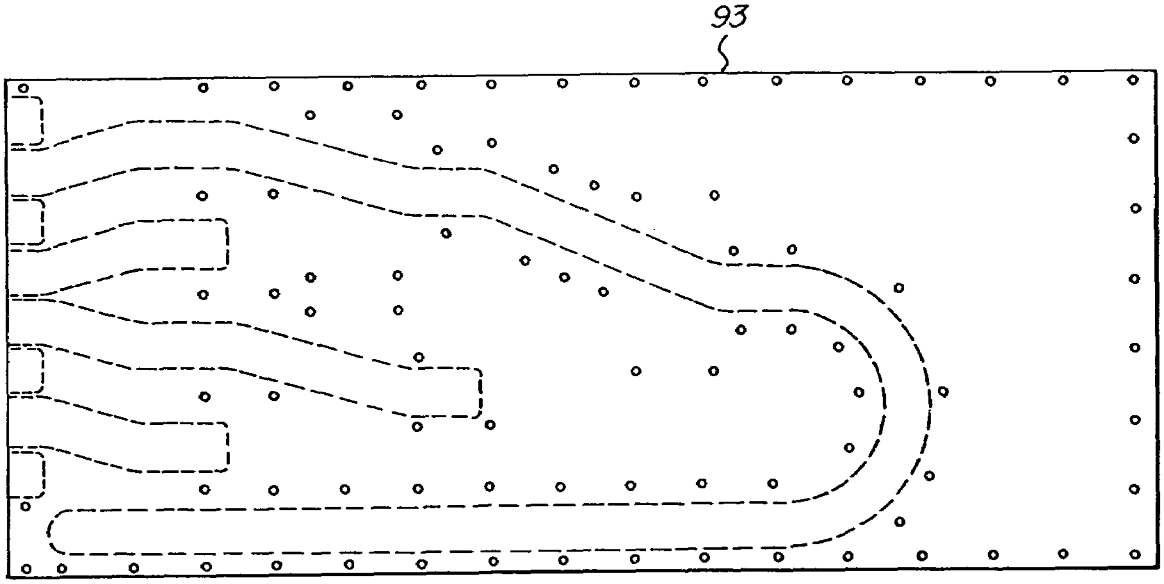
FIG. 8 is a plan view of a second top half of the waveguide feed of FIG. 7.

Referring to FIGS. 7–8 which are plan views of an embodiment of a waveguide feed 34, it is to be appreciated that the waveguide feed 34 can be formed as two plates 91, 93 that are mirror images of each other such as illustrated in FIGS. 7–8. In addition, it is to be appreciated that since each path from the input/output port 37 of the waveguide feed to the signal ports 38–52 is identical and because each path has a mirror-image orientation, the waveguide feed operates to add the electromagnetic signals received at ports 38–52 from the antenna 28 and to provide the summed signal at input/output port 37 or to divide an electromagnetic signal provided at input/output port 37 to provide a equally divided signal both in amplitude and phase at ports 38–52.

Figure 9:
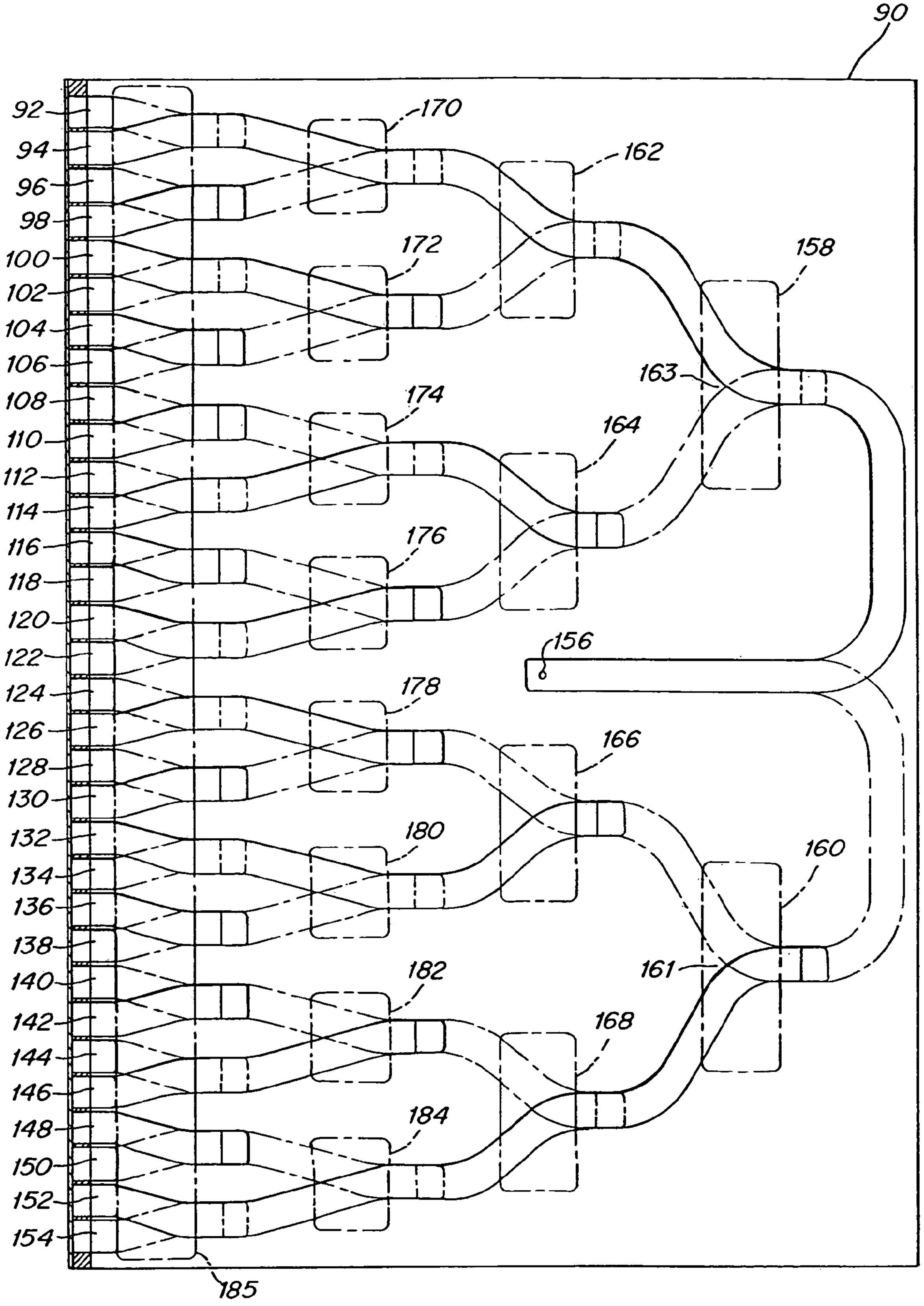
FIG. 9 is a cross-sectional bottom plan view of an alternate embodiment of a waveguide feed assembly for the antenna of the present invention.

It is to be appreciated that although the discussion above has been directed to an antenna array including eight waveguides and an 1-to-8 waveguide feed 34 as illustrated in FIGS. 4–8, the waveguide feed 34 and waveguide antenna 28 of the present invention can be made up of any of 2, 4, 8, 16, 32, 64, 128 and the like waveguides forming the antenna array and a corresponding 1-to-2, 1-to-4, 1-to-8, 1-to-16, 1-to-32, 1-to-64, 1-to-128 and the like waveguide feed. For example, FIG. 9 illustrates a schematic view of an alternative embodiment of a waveguide feed 90 according to the present invention. The waveguide feed 90 is a 1-to-32 element waveguide feed that operates in a manner similar to the 1-to-8 waveguide feed 34 discussed above, to either add signals received from thirty two corresponding waveguides of an antenna array at ports 92, 94, 96, 98, 100, 102, 104, 106, 108, 110, 112, 114, 116, 118, 120, 122, 124, 126, 128, 130, 132, 134, 136, 138, 140, 142, 144, 146, 148, 150, 152, and 154 and provide a summed signal at input/output port 156 or to divide an electromagnetic signal at input/output port 156 and to provide an equal amplitude and phase signal at each of signal ports 92–154. The waveguide feed 90 may have a plurality of septums 158, 160, 162, 164, 166, 168, 170, 172, 174, 176, 178, 180, 182 and 184 to aid in the corresponding transitions from a full height waveguide to two half-height waveguides that occur at transition points 161, 163 or to transition from a single half-height waveguide to two half-height waveguides at septums 162–184. It is to be appreciated that each of the waveguide sections will be a mirror image of an adjacent waveguide section of a pair of waveguide sections wherein if one waveguide section has an incline in height an adjacent waveguide element will have a decline in height to provide the half-height waveguide.

It is to be appreciated that the antenna 28 according to the present invention can be used on any of a number of mobile platforms and should have a high-gain, a small size, and a good cross-polarization rejection for successful reception of digital satellite broadcasting video signals. Additionally, it is to be appreciated that for aircraft and many other moving platforms, the antenna should be low in height and reduced in length to minimize any drag provided by the antenna and to maintain the esthetics of the mobile platform. It is known that any residual drag of the antenna and radome on a moving vehicle such as an aircraft and fast moving ground vehicles, including automobiles, increases the fuel costs of operating the moving vehicles. Over the life of the vehicle the supplemental fuel costs associated with the drag of the radome and the antenna can equal or exceed the cost of the antenna system. A low-height radome with a proper curved outer surface (camber) can greatly reduce a parasitic drag caused by air flowing over the radome. This is why contemporary automobiles or moving platforms are frequently designed and tested in wind tunnels to reduce the parasitic drag of the vehicles.

Thus, the parasitic drag is of primary importance to an antenna system to be used on a moving vehicle. Accordingly, a low-height (and low-drag), low-cost antenna system is needed. In addition, the expense of the radome depends, for example, on transmissivity requirements such as refraction, absorption, and reflection to, for example, a circularly polarized signal to maintain the quality signal and the constituent materials of the radome, as well as the total volume of the radome materials. Thus, a low-height antenna and radome also reduces the volume and materials cost associated with the radome and thus the expense of the radome. In addition, as is known to those of skill in the art, an antenna with a long horizontal dimension has a narrow beam width in azimuth which complicates continued tracking of the transmitting satellite 26 (see FIG. 1) since the antenna must be moved to keep the satellite within the antenna beam width. As is known to those of skill in the art a maximum theoretical gain of an antenna is determined by a subtended area of the antenna array projected in the direction of the satellite and can be described by Equation (1):

$$G=4\pi A/\lambda^2 \tag{1}$$

where G is the gain of the antenna, A is the subtended area of the antenna and λ is a wavelength of an operating frequency of the antenna. A typical gain of approximately 34 dB is needed for reception of direct broadcast satellite video for the continental United States. This gain results in an effective area of the antenna at a mid-band of the operating frequency range, which is typically 12.2 to 12.7 GHZ in the United States and South America or 11.7 to 12.2 GHZ in Europe, of approximately two hundred and eighty eight square inches. One embodiment of the present invention is a thirty-two waveguide element array having a width of approximately twenty-four inches in the azimuth plane; the array thus will have a length of approximately twelve inches. A height of a top of the array above the mobile platform surface is established by the array length and by a lowest elevation angle θ at which the antenna will be pointed such as, for example, 20°. For an array with a beam pattern that is perpendicular to the plane of the array, the height is determined by Equation (2):

$$H=L\cos(\theta) \tag{2}$$

where H is the height of the antenna L is the length of the antenna and θ equals the elevation angle. Thus, for the above-described antenna array, the height is approximately 11.3". However, as discussed above, according to a preferred embodiment of the antenna it is desired to offset the antenna beam pattern in the elevation direction from the perpendicular of the array. In order to maintain the same effective area of the antenna, the length of the antenna array increases by 1/cos (offset angle); but the overall height above the vehicle decreases by the relationship of Equation (3):

$$H=L\cos(\theta+\text{offset angle})/\cos(\text{offset angle}) \tag{3}$$

Thus, for the preferred embodiment of the thirty-two waveguide element antenna of the present invention having a 45° offset angle and a minimum elevation angle of 20°, the array length of 12" will increase to 17" while the height of the antenna will be reduced from approximately 11.3" to approximately 7.2". Thus, according to the preferred embodiment of the invention the peak of the main beam is offset from the perpendicular to the array to minimize height of the array when the antenna array is operated at low elevation angles off of the horizon. One advantage is that this also reduces the required radome size and any drag due to air resistance of the antenna and radome.

As discussed above, it may be desirable to reduce a complexity of and height of the tracking mechanism of the antenna by, for example, reducing the need to scan the antenna in elevation angle. This can be accomplished, for example, by providing the waveguide feed of the present invention with a plurality of phase shifters disposed within the waveguide feed at, for example, each junction point where there is a single waveguide to two waveguide transition. The plurality of phase shifters can be used to electronically steer the beam pattern in the elevation angle over, for example, the 50° elevation range from approximately 20° to 70°. The phase shifters may be, for example, waveguide mounted phase shifters that are any of electrical, electromechanical or even mechanical as are known to those of skill in the art. An alternative embodiment that may also be used to scan the antenna in elevation angle may be to form the narrow waveguide walls (E-plane walls) of the plurality of radiation waveguides so that they are dynamically variable and so that a spacing between the narrow walls can be varied to change the elevation angle of the antenna beam pattern. For example, when it is desired to scan the antenna in elevation angle, a mechanism such as, for example, a motor may be used to cause the dynamically variable waveguide walls to be increased or decreased in the vertical direction to scan the antenna beam and elevation angle. Some examples of waveguide walls that may be dynamically variable so as to change the spacing between the waveguide walls can be any of a continuous, corrugated, serrated, or folded walls such as, for example, diamond-shaped waveguide walls that provide vertical flexibility in the waveguide walls. The vertical flexibility may allow the sidewalls to be moved in and out of compression to vary the spacing between the narrow walls to scan the antenna in elevation angle. It is to be appreciated that for any embodiment where the waveguide walls and the spacing between the waveguide walls are to be variable, the narrow walls must still allow for contact between the narrow wall and the broad walls of the waveguide. These contacts may be accomplished for example by any of rivets, eyelets, or other fastener devices that may be used to align one section of the waveguide with corresponding through holes in another section of the waveguide so as to allow movement of the sections with respect to each other while maintaining the desired electrical contact.

Another embodiment of the antenna subsystem of the invention may include 2 arrays such as, for example, two 32-waveguide element arrays each having a respective offset angle of, for example, 35° and 65°. An advantage of this embodiment is that each respective waveguide array need only be physically or electrically steered over, for example, a 30° elevation angle range, in particular the array having an offset angle of 35° will be scanned or moved in elevation angle from 20° to 50°, while the array having the offset angle of 65° will be scanned or moved in elevation angle from 50° to 80°. An advantage of this embodiment is that since each array need only be steered over a 30° range in elevation angle, the overall height of the antenna and tracking system can be reduced.

Figure 10:
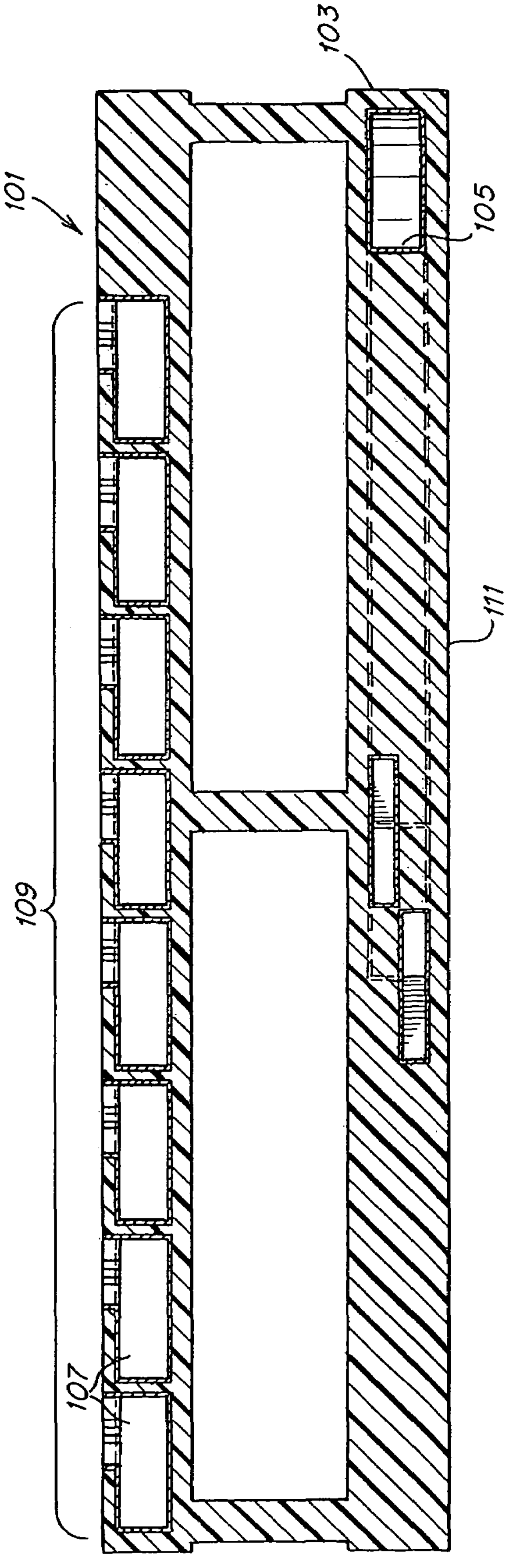
FIG. 10 is a cross-sectional end view of an extruded embodiment of the antenna of the present invention.

In addition to having a low-height and short length it is also desirable that the antenna of the present invention have low manufacturing costs, a low-weight, be simple to manufacture and be able to operate in an environment of extreme temperatures, density, altitude, shock, vibration and humidity that is common to many mobile vehicles. Each of these objects can be obtained according to the present invention by an antenna structure that is made of advanced composites. For example, one embodiment 101 of the present invention as illustrated in cross-section in FIG. 10, includes a cast structure 103 of a base composite material that is plated with a metal plating 105 to provide an antenna array 109 of waveguides 107 and a waveguide feed 111. In a preferred embodiment of the antenna, the antenna is molded without ends of the waveguide and so that each aperture (not illustrated) within each broad wall of each substantially rectangular waveguide of the waveguide array is formed as part of an injection molding process to form the waveguide array and waveguide feed structure. An advantage of this process is that it has reduced tooling costs and is feasible to mold. It is to be appreciated however that other molding processes such as, for example, compression molding of sheet molding compounds can also be used to inexpensively produce an antenna array in one or more parts. Each of the molding tools and processes to produce the array are known and can be used to form the antenna array and waveguide feed to the net desired dimensions.

Once the base material has been molded into either unitary or piece parts of antenna array and waveguide feed, the antenna array and waveguide feed can then be plated using known forms of plating such as, for example, electroless or electrolytic plating processes. In addition, it is to be appreciated that in some instances application of an additional base material may be used to improve adhesion of a metallic coating to the base material. It should also be appreciated that sometimes a combination of electroless and electrolytic platings may be used. The plating is used to form a conductive shell internal, and if desired, external to the waveguide and the waveguide feed.

In one embodiment of the antenna 101 according to the present invention, preformed metal slots can be inserted into the molded base material to from the apertures (not illustrated) within each broad wall of each waveguide 107 to reduce complexity and precision requirements of the molding tool and of the plating process. In addition, it is to be appreciated that when using such inserts, it may not be necessary to plate the through-holes in the base material that provide the slots where the inserts are inserted. One method of inserting the inserts may be to use ultrasonic insertion which provides fast and economical anchoring of metal inserts and also provides a high degree of mechanical reliability with excellent pull-out and torque retention. Another advantage of ultrasonic insertion is that it results in lower residual stresses compared to other methods of insertion, because it insures a uniform melt and minimal thermal shrinkage. Another advantage of inserting preformed metal slots into the molded base material is that it results in reduced handling costs, especially if the cycle time of the molded part allows for secondary operations to be performed by the injection molding machine operator.

It is to be appreciated that selection of a base material is important to the design and construction of the antenna array and waveguide feed, to the plating of the base material and to providing inserts, if any, since each of the base material, the plating and the inserts may have different coefficients of thermal expansion thereby inducing stresses within the antenna and waveguide feed structure. Similar stresses may also include those due to the environment in which the antenna is to be operated such as shock, vibration, as well as humidity. All these factors influence the determination of the base material and the conductive coating. For example, on an aircraft, an extremely low-density, high-strength, dimensionally-stable material with low water absorption is desired. In a preferred embodiment, the antenna array and waveguide feed are molded from ULTEM®, which is a polyetherimide and is a registered trademark of GE. However, it is to be appreciated that other candidate materials include fibrous composite or reinforced resins, as well as a polyester resin. Each has a specific gravity in a range of 1.5 to 2.0. Compare the specific gravity of these base materials with, for example, aluminum which is approximately 2.7 and it is obvious that a significant savings in weight of the antenna and the waveguide feed can be achieved. In addition, polyetherimides and polyesters can be assembled using known processes such as those discussed above. Further, it is to be appreciated that assembly of injection molded pieces to make up the antenna and waveguide feed can be done by any of snap fits, adhesive bonding, solvent bonding, molded threads, inserts, ultrasonic bonding and others. Moreover, due to the superior physical properties of these base materials, a strong-lightweight array antenna and waveguide feed can be provided. Thus, an advantage of the antenna and waveguide feed 101 of the present invention that when molded from such base materials it has a structural strength and rigidity as well as resistance to environmental factors. In addition, an interior of each substantially rectangular waveguide can be effectively or environmentally sealed and inherently adapted for introduction of gas pressurization, if needed, for example to prevent moisture penetration.

Figure 11A:
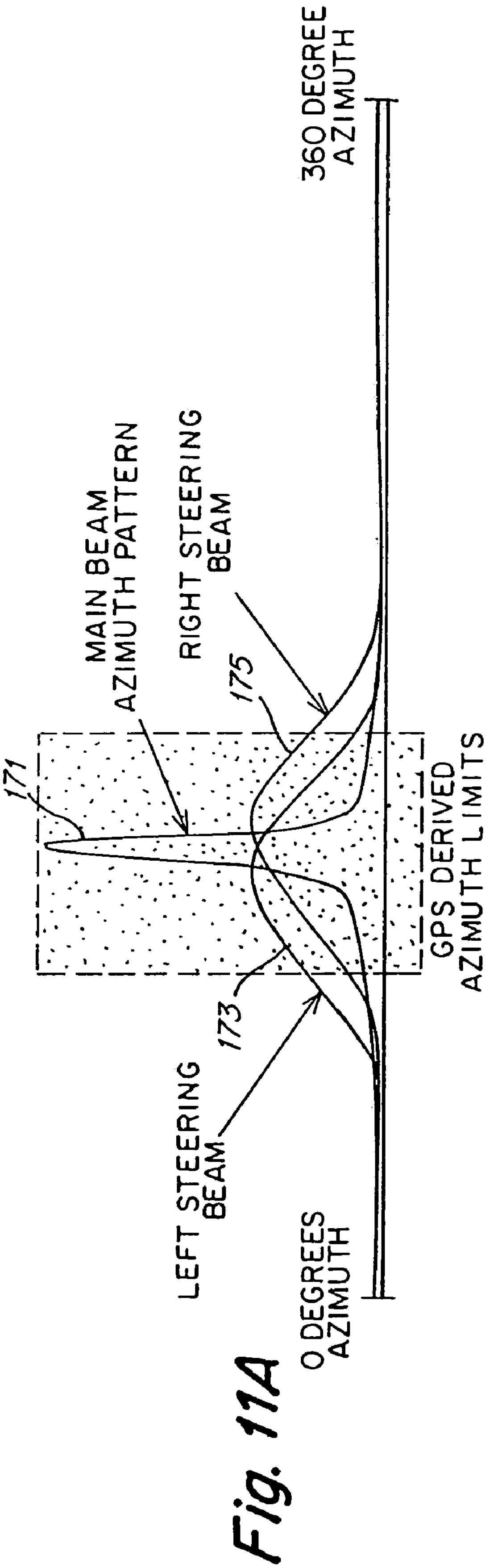
FIG. 11 is a plot illustrating a beam pattern of the antenna of the present invention including a main antenna beam and a plurality of steering array antenna beams.
Figure 11B:
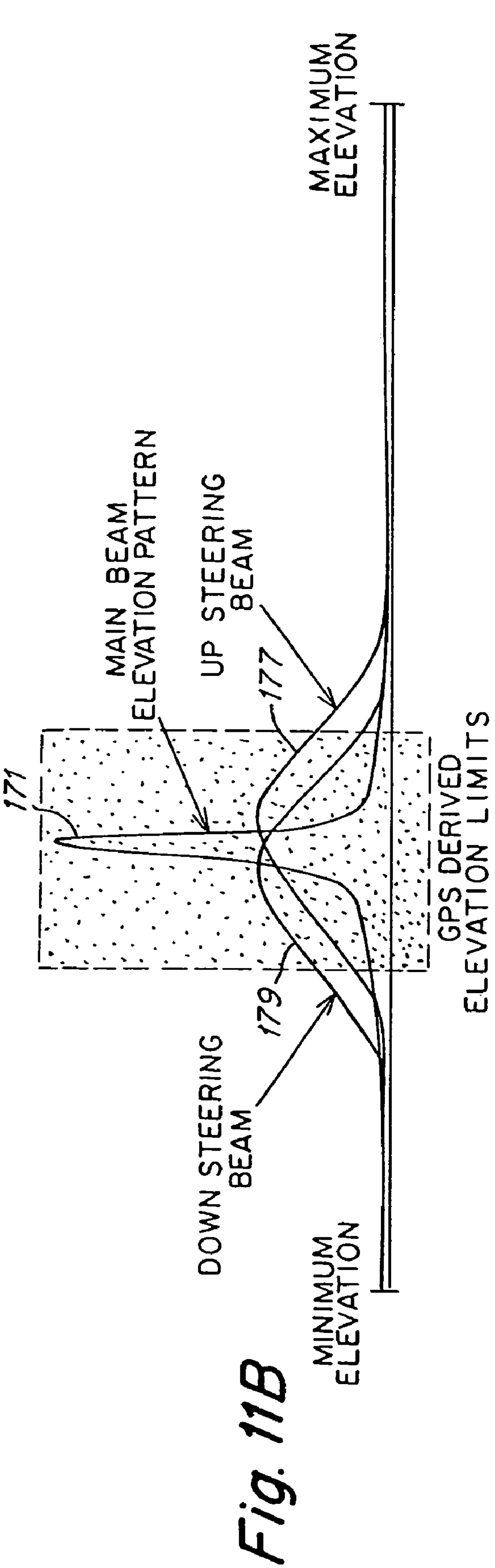

The antenna of the present invention can also be provided with a plurality of steering arrays that can be co-located under the radome with the antenna array to aid in positioning the beam pattern of the antenna array. The steering arrays will be moved in azimuth and in elevation in conjunction with the antenna array so that the physical relationship between the steering arrays and the antenna array remain constant. FIG. 11 illustrates a plot in azimuth an elevation of an antenna beam pattern of the antenna array and the steering arrays. Each of the steering arrays has a corresponding antenna beam pattern 172, 174, 176, 178 that is offset from the beam pattern 170 of the antenna array such as is illustrated in FIG. 11. In particular, the steering array's beam pattern may be located for example, to the left in azimuth 172 and to the right 174 in azimuth of the beam pattern 170 of the antenna array, above 176 in elevation and below 178 in elevation the beam pattern of the antenna array. The signals received by the steering arrays can be processed in, for example, pairs such as the left-right pair and the up-down pair to aid in azimuth and elevation tracking of the antenna array. For example, the steering array patterns 172, 174, 176, 178 can be made to cross at the center of the beam pattern 170 of the antenna array so that equal amplitude signals are received from each steering array at the center of the beam pattern of the antenna array. Thus, if a large amplitude signal is received from the right steering array with respect to the left steering array, the antenna array can be moved to the left until an equal amplitude signal is received from both steering arrays. Similarly, the antenna can be moved in response to signals received from the up-down pair of steering arrays. Processing of signal output from the steering array outputs is amplitude based thereby eliminating a need for phase tracking between processing modules and permitting operation with a single channel processing chain.

Figure 12:
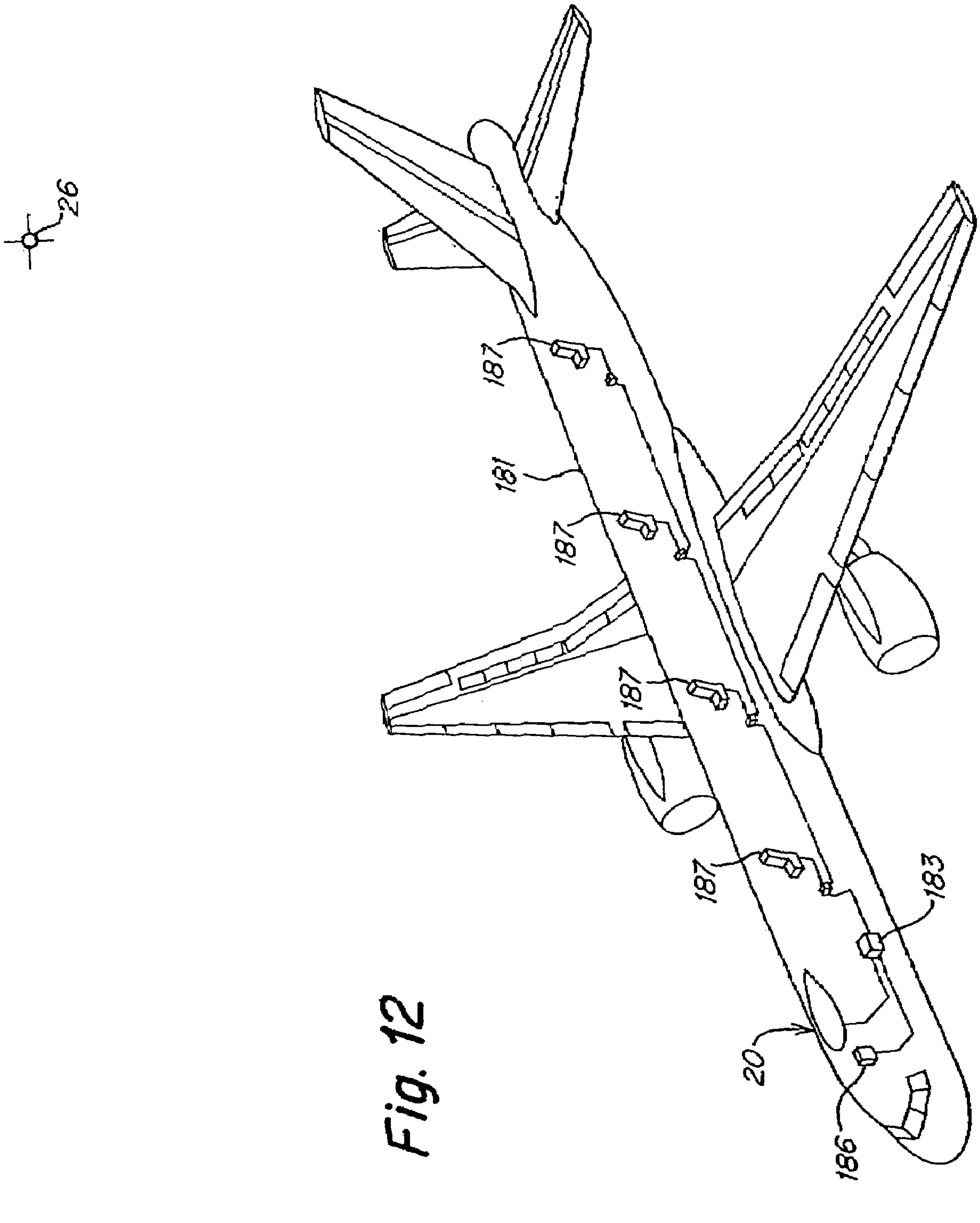
FIG. 12 is a perspective view of the antenna subsystem of the present invention mounted to the fuselage of an aircraft.

FIG. 12 illustrates a possible location of the antenna subsystem 20 of the present invention on an aircraft 180. The antenna is located on the exterior of the aircraft, for example, on the top of the fuselage for a clear, unobstructed view in the direction of the satellite 26 under reasonable orientation of the aircraft. The system of the present invention may include satellite receivers 182 that may be located, for example, in a cargo area of the aircraft. In addition, the system may include seat back video displays 184, associated headphones and a selection panel to provide channel selection capability to each passenger. Alternatively, video may also be distributed to all passengers for shared viewing through a plurality of screens placed periodically in the passenger area of the aircraft. Further, the system may also include a system control/display station that may be located, for example, in the cabin area for use, for example, by a flight attendant on a commercial airline to control the overall system and such that no direct human interaction with the equipment is needed except for servicing and repair.

As discussed above, the antenna 28, the steering arrays and the waveguide feed 34 can be used to make up the satellite tracking antenna subsystem 20 that can be used as the front end of a satellite video reception system on a moving vehicle such as the aircraft of FIG. 12. The satellite video reception system can be used to provide to any number of passengers within the aircraft with live programming such as, for example, news, weather, sports, network programming, movies and the like. In particular, the antenna will track the motion of the vehicle in azimuth and in elevation to keep the antenna beam pattern focused on the transmitting satellite 26, will receive the live broadcast video signals from the transmitting satellite, and will present the live broadcast video signals to a receiver system 182 which will distribute the desired programs to each passenger, as selected by each passenger.

One problem with providing a signal such as, for example, any of a live video programming signal, or a communications signal such as a telephone signal, or interactive services such as internet services, or other data signals to passengers in a vehicle such as, for example, an aircraft during a transoceanic flight is that satellites or ground communication stations are not always positioned so as to provide the signal to the moving vehicle for the entire path of its trip. According to the present invention, a method of providing a signal to passengers in a vehicle in an area where the signal is not available such as, for example, an area that is not within the coverage area of an existing satellite, or an area where ground to air communications are not available, or an area where continuous coverage is not available, or an area where a signal quality is poor includes receiving the signal with a first receiver in an area where the signal is available. It is to be appreciated that according to this specification, an area where there is not continuous satellite coverage is defined as any area where a signal cannot be continuously received such as, for example, over the Atlantic Ocean where if one satellite is positioned over the Atlantic, a transmitted signal may be a drop off in strength for portions of the Atlantic Ocean but provide an adequate signal for other portions of the Atlantic Ocean.

For a transoceanic flight, the first receiver may be located on a communications tower positioned on the ground to communicate with an aircraft that is about to begin or has just begun the transoceanic portion of the flight or may be located on an aircraft itself that is still within the coverage area of a satellite as it flies over or near a coast line. Since, as is known to those aviation industry, flights such as, for example, transatlantic flights occur at approximately the same altitude wherein a plurality of aircraft travel across the Atlantic Ocean in a set of parallel paths, known as "tracks" forming rows of aircraft spaced at, for example, two minutes apart one in front of another, a next step in the method of providing the signal to the passengers is to retransmit the received signal by the first receiver to a second receiver that is located, for example, on an aircraft that is in a back of the track of aircrafts making the transoceanic flight. An additional step in the method is to receive the retransmitted signal with the second receiver and to then retransmit the received signal from the second receiver to a third receiver located on another aircraft that is, for example, located in front of the aircraft housing the second receiver. This step can be repeated along the track of aircrafts across the entire ocean to provide any of the live video programming, two-way communications signals, or interactive services, or other data signals to each passenger within the plurality of aircraft crossing the ocean.

Although this example has been provided with respect to aircraft in a transoceanic flight pattern, it is to be appreciated that this method can be applied to any aircraft anywhere in the world where the flight path is not within a coverage area of a transmitting satellite, or where ground to air communications signals are not available, or where continuous satellite or communications signal coverage is not available, or where signal reception quality is poor. It is also to be appreciated that although this example has been illustrated with each aircraft receiving and retransmitting the signal, this method can be used where only some of the aircraft receiving and retransmitting the signal and with others, for example, only receiving the signal and not retransmitting the signal. It is further to be appreciated that although this method has been described with respect to aircraft, it can be applied to any vehicle such as, for example, a plurality of automobiles driving in any area of any country within the world that is not within any of the above-described signal coverage areas.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A system that provides information to a second passenger vehicle, to create an information network between the second passenger vehicle and an information source, the system comprising:

a first transmitter/receiver unit disposed on a first passenger vehicle and adapted to receive an information signal that includes the information from the information source, and to transmit the information signal;

a directional antenna having focused transmit and reception patterns that is coupled to the first transmitter/receiver unit and is adapted to receive and transmit the information signal;

a third transmitter/receiver unit adapted to receive the information signal and to transmit the information signal, to provide the information signal between the first transmitter/receiver unit and the second passenger vehicle;

a second transmitter/receiver unit located on the second passenger vehicle, the second transmitter/receiver unit being adapted to receive the information signal; and a passenger interface coupled to the second transmitter/receiver unit and adapted to provide at least some of the information for access by a passenger associated with the second passenger vehicle.

2. The system as claimed in claim 1, wherein the third transmitter/receiver unit is located on a fixed platform.

3. The system as claimed in claim 1, wherein the second passenger vehicle is in an area where no satellite coverage is available.

4. The system as claimed in claim 1, wherein the second passenger vehicle is in an area where satellite coverage is available.

5. The system as claimed in claim 1, wherein the information signal comprises a video programming signal.

6. The system as claimed in claim 1, wherein the information maintenance information for the second passenger vehicle.

7. The system as claimed in claim 1, wherein the information comprises positional information of the first passenger vehicle.

8. The system as claimed in claim 1, wherein the information comprises vital information for the passenger.

9. The system as claimed in claim 1, wherein the information comprises Internet-related data.

10. The system as claimed in claim 1, wherein the information comprises telecommunications data.

11. The system as claimed in claim 1, wherein the information comprises weather information.

12. The system as claimed in claim 1 wherein the third transmitter/receiver unit is located on a third passenger vehicle.

13. The system as claimed in claim 12, wherein the third transmitter/receiver unit is further adapted to transmit the information signal to at least one additional receiver.

14. The system as claimed in claim 1, wherein the second transmitter/receiver unit is located on a satellite.

15. The system as claimed in claim 1, wherein the source is located on the first passenger vehicle.

16. The system as claimed in claim 1, further comprising a second passenger interface coupled to the first transmitter/receiver unit that is adapted to provide at least some of the information to a passenger associated with the first passenger vehicle.

17. A system that provides information to a second passenger vehicle, to create an information network between the second passenger vehicle and an information source, the system comprising:

a first transmitter/receiver unit disposed on a first passenger vehicle and adapted to receive an information signal that includes the information from the information source, and to transmit the information signal;

a third transmitter/receiver unit adapted to receive the information signal and to transmit the information signal, to provide the information signal between the first transmitter/receiver unit and the second passenger vehicle;

a second transmitter/receiver unit located on the second passenger vehicle, the second transmitter/receiver unit being adapted to receive the information signal; and a passenger interface coupled to the second transmitter/receiver unit and adapted to provide at least some of the information for access by a passenger associated with the second passenger vehicle;

wherein each of the first, second and third passenger vehicles travels along a line of travel, and wherein the receipt of the information signal and transmission of the information signal between each of the first, second and third passenger vehicles is along the line of travel a directional antenna having focused transmit and reception patterns that is coupled to the first transmitter/receiver unit and is adapted to receive and transmit the information signal.

18. The system as claimed in claim 17, wherein each of the first, second and third passenger vehicles is an aircraft and the information network is a sky network.

19. The system as claimed in claim 18, wherein the aircraft are located on a flight track, and wherein the line of travel is along the flight track.

20. The system as claimed in claim 17, wherein each of the first, second and third passenger vehicles is a ground vehicle, and wherein receipt of and transmission of the information signal between the ground vehicles creates a network for the information signal.

21. The system as claimed in claim 17, further comprising a radome that at least partially surrounds the antenna and that is transmissive to the information signal provided to and from the antenna.

22. The system as claimed in claim 17, further comprising an omni-directional antenna that is coupled to the first transmitter/receiver unit and is adapted to receive and transmit the information signal.

23. A method for providing information from a source to a second passenger vehicle, the method comprising acts of:

receiving an information signal that includes the information at a first passenger vehicle;

re-transmitting the information signal in a focused transmit pattern from the first passenger vehicle;

receiving the information signal and re-transmitting the information signal in a focused transmit pattern to provide the information signal between the first passenger vehicle and the second passenger vehicle;

receiving the information at the second passenger vehicle; and providing at least some of the information for access by a passenger associated with the second passenger vehicle.

24. The method as claimed in claim 23, wherein the acts of receiving the information signal and re-transmitting the information signal to provide the information signal between the first passenger vehicle and the second passenger vehicle include receiving the information signal at a fixed platform and re-transmitting the information signal from the fixed platform.

25. The method as claimed in claim 23, wherein the act s of receiving and re-transmitting the information signal include receiving and re-transmitting a video programming signal.

26. The method as claimed in claim 23, wherein the act s of receiving and re-transmitting the information signal include receiving and re-transmitting maintenance information for the second passenger vehicle.

27. The method as claimed in claim 23, wherein the act s of receiving and re-transmitting the information signal include receiving and re-transmitting positional information of the first passenger vehicle.

28. The method as claimed in claim 23, wherein the act s of receiving and re-transmitting the information signal include receiving and re-transmitting vital information for the passenger.

29. The method as claimed in claim 23, wherein the act s of receiving and re-transmitting the information signal include receiving and re-transmitting Internet-related data.

30. The method as claimed in claim 23, wherein the act s of receiving and re-transmitting the information signal include receiving and re-transmitting telecommunications data.

31. The method as claimed in claim 23, wherein the act s of receiving and re-transmitting the information signal include receiving and re-transmitting weather information.

32. The method as claimed in claim 23, wherein the act s of receiving the information signal and re-transmitting the information signal to provide the information signal between the first passenger vehicle and the second passenger vehicle comprise receiving the information signal at a third passenger vehicle and re-transmitting the information signal from the third passenger vehicle.

33. The method as claimed in claim 32, wherein the first, second and third passenger vehicles are ground vehicles, and wherein the acts of transmitting and re-transmitting the information signal include transmitting and re-transmitting the information signal between the ground vehicles to create a network for the information signal.

34. The method as claimed in claim 32, wherein the act of re-transmitting the information from the third passenger vehicle includes re-transmitting the information signal to the second passenger vehicle and to at least one additional passenger vehicle.

35. The method as claimed in claim 23, wherein acts of receiving the information signal and re-transmitting the information signal to provide the information signal between the first passenger vehicle and the second passenger vehicle include receiving the information signal at a satellite and re-transmitting the information signal from the satellite.

36. The method as claimed in claim 23, wherein the act of receiving the information signal at the first passenger vehicle includes receiving the information signal from a source located on the first passenger vehicle.

37. The method as claimed in claim 23, further comprising an act of providing at least some of the information to another passenger associated with the first passenger vehicle.

38. A method for providing information from a source to a second passenger vehicle, the method comprising acts of:

receiving an information signal that includes the information at a first passenger vehicle;

re-transmitting the information signal from the first passenger vehicle;

receiving the information signal at a third passenger vehicle and re-transmitting the information signal from the third passenger vehicle to provide the information signal between the first passenger vehicle and the second passenger vehicle;

receiving the information at the second passenger vehicle; and providing at least some of the information for access by a passenger associated with the second passenger vehicle;

wherein the act s of transmitting and re-transmitting the information signal include transmitting and re-transmitting the information signal between the first, second and third passenger vehicles along a line of travel of the first, second and third passenger vehicles wherein the acts of re-transmitting the information signal are performed by re-transmitting the information signal in a focused transmit pattern.

39. The method as claimed in claim 38, wherein the first, second and third passenger vehicles are aircraft, and wherein the acts of transmitting and re-transmitting the information signal include transmitting and re-transmitting the information signal between the aircraft along a flight track along which the aircraft are traveling.

40. The method as claimed in claim 38, wherein the acts of re-transmitting the information signal are performed by re-transmitting the information signal in an omnidirectional pattern.

* * * * *

UNITED STATES PATENT AND TRADEMARK OFFICE

CERTIFICATE OF CORRECTION

PATENT NO. : 7,181,160 B2
APPLICATION NO. : 10/810369
DATED : February 20, 2007
INVENTOR(S) : Michael J. Barrett It is certified that error appears in the above-identified patent and that said Letters Patent is hereby corrected as shown below:

In column 14, line 37, claim 17, “travel” should read --travel; and--;
In column 14, line 38 claim 17 should not be indented.

In column 16, lines 40-41, claim 38 “vehicles wherein” should read --vehicles; and wherein--.

Signed and Sealed this

Fourteenth Day of August, 2007

JON W. DUDAS
*Director of the United States Patent and Trademark Office*